US010942635B1

United States Patent
Rakshit et al.

(10) Patent No.: US 10,942,635 B1
(45) Date of Patent: Mar. 9, 2021

(54) DISPLAYING ARRANGED PHOTOS IN SEQUENCE BASED ON A LOCUS OF A MOVING OBJECT IN PHOTOS

(71) Applicant: International Business Machines Corporation, Armonk, NY (US)

(72) Inventors: Sarbajit K. Rakshit, Kolkata (IN); James E. Bostick, Cedar Park, TX (US); John M. Ganci, Jr., Raleigh, NC (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/797,319

(22) Filed: Feb. 21, 2020

(51) Int. Cl.
*G06F 3/048* (2013.01)
*G06F 3/0484* (2013.01)
*G06F 16/58* (2019.01)
*G06F 3/0482* (2013.01)
*G06F 3/01* (2006.01)

(52) U.S. Cl.
CPC ........ G06F 3/04845 (2013.01); G06F 3/0482 (2013.01); G06F 16/58 (2019.01)

(58) Field of Classification Search
CPC ..... G06F 16/58; G06F 3/04845; G06F 3/0482
See application file for complete search history.

(56) References Cited

U.S. PATENT DOCUMENTS

| 7,884,855 | B2 * | 2/2011 | Ortiz | H04N 7/18 348/211.8 |
| 8,118,434 | B2 | 2/2012 | Turner et al. | |
| 8,189,051 | B2 | 5/2012 | Shih et al. | |
| 8,340,654 | B2 * | 12/2012 | Bratton | H04N 7/185 455/420 |
| 8,634,589 | B2 | 1/2014 | Shimizu | |
| 8,830,193 | B2 * | 9/2014 | Shah | G06F 3/0488 345/173 |
| 9,112,936 | B1 * | 8/2015 | Poletto | H04L 29/08117 |
| 9,778,830 | B1 * | 10/2017 | Dubin | A63F 13/65 |

(Continued)

FOREIGN PATENT DOCUMENTS

EP    0886256 B1    3/2007

OTHER PUBLICATIONS

IEEE Transactions on Visualization and Computer Graphics vol. 19 No. 12, Dec. 2013 pp. 2119-2128), attached herein as PDF Document titled "NPL Meghdadi.Amir.H. IEEE Dec. 12, 2013 06634090"; herein referred to as Meghdadi (Year: 2013).*

(Continued)

*Primary Examiner* — Nicholas Augustine
(74) *Attorney, Agent, or Firm* — Jay Wahlquist; Madeline F. Schiesser; Keohane & D'Alessandro, PLLC

(57) ABSTRACT

Approaches presented herein enable arranging images in a sequence for displaying based on a locus of a moving object in the images. Specifically, a moving object in a plurality of images is selected and metadata of the plurality of images analyzed to determine a locus of the moving object. The plurality of images is arranged along the locus of the moving object in a display environment. Image parameters may be adjusted according to an image placement along the locus, such as angular tilt and size. A place along the locus may be selected and additional images searched for based on a geo-locational metadata tag. The plurality of images may be a series of video frames or a group of photographs.

20 Claims, 4 Drawing Sheets

(56) References Cited

U.S. PATENT DOCUMENTS

| | | | |
|---|---|---|---|
| 2009/0164439 A1* | 6/2009 | Nevins | G06F 16/2477 |
| 2010/0013924 A1 | 1/2010 | Hasegawa et al. | |
| 2010/0141781 A1 | 6/2010 | Lu | |
| 2010/0321527 A1 | 12/2010 | van Schalkwyk | |
| 2011/0032388 A1 | 2/2011 | Manico et al. | |
| 2013/0129307 A1* | 5/2013 | Choe | A63F 13/48 |
| | | | 386/227 |
| 2013/0282421 A1* | 10/2013 | Graff | H04L 63/08 |
| | | | 705/7.18 |
| 2014/0232873 A1* | 8/2014 | Meganathan | G07C 1/00 |
| | | | 348/152 |
| 2014/0301598 A1 | 10/2014 | Marty et al. | |
| 2015/0058709 A1* | 2/2015 | Zaletel | H04L 65/604 |
| | | | 715/202 |
| 2015/0058730 A1* | 2/2015 | Dubin | A63F 13/327 |
| | | | 715/719 |
| 2015/0208205 A1* | 7/2015 | Chan | H04L 67/1095 |
| | | | 709/217 |
| 2016/0104512 A1 | 4/2016 | DiMare et al. | |
| 2017/0148241 A1* | 5/2017 | Kerning | G08B 27/006 |
| 2018/0322197 A1* | 11/2018 | Hesterman | B61L 3/002 |
| 2019/0147219 A1 | 5/2019 | Thornbrue et al. | |

OTHER PUBLICATIONS

Locus (mathematics), Wikipedia, the free encyclopedia, https://en.wikipedia.org/wiki/Locus_(mathematics), date cited Jun. 23, 2015.

Microsoft Surface Tablets—The tablet that can replace your lalptop, http:www.microsoft.com/surface/en-us, date cited Jun. 24, 2015.

Franklin, Eric, Microsoft Surface review: Innovative tablet stranded in an app desert, http://www.cnet.com/products/microsoft-surface/rt/, date cited Jun. 24, 2015.

* cited by examiner

DISPLAYING ARRANGED PHOTOS IN SEQUENCE BASED ON A LOCUS OF A MOVING OBJECT IN PHOTOS

TECHNICAL FIELD

The present invention relates generally to arranging photographic images on a computerized display and, more specifically, to sequencing a set of images on a display according to a locus of a moving object in the images.

BACKGROUND

In an image display environment, such as a tablet display touch device, multiple images, such as photographs, may be viewed and manipulated. For example, a user may manipulate the positions of a set of photographs with a touch or a finger gesture. In some image display environments, a group of images or photographs may be arranged or sequenced for a user by attributes such as size, date, and/or time. A user may make a variety of modifications to a group of images or photographs, such as modifying the shape or changing the position of the images or photographs being displayed.

In a separate technological area, a locus is a set of points whose location satisfies or is determined by one or more specified conditions. For example, a circle is the set of points for which the distance (i.e., the radius) from a single point is constant. The set of points that define the movement of an object through space may likewise be described as the locus of that object. In an illustrative example, the trail of a jet engine would show a locus of a jet aircraft as it soared through the air.

SUMMARY

In general, embodiments described herein provide approaches for arrangement of images in a sequence for display based on a locus of a moving object in the images. Specifically, a moving object in a plurality of images is selected and metadata of the plurality of images analyzed to determine a locus of the moving object. The plurality of images is arranged along the locus of the moving object in a display environment. Image parameters may be adjusted according to an image placement along the locus, such as angular tilt and size. A place along the locus may be selected and additional images searched for based on a geo-locational metadata tag. The plurality of images may be a series of video frames or a group of photographs.

One aspect of the present invention includes a method for arranging images in a sequence for display based on a moving object, the method comprising obtaining a plurality of images; obtaining a selection of an object by a user, the object being selected from an image of the plurality of images; obtaining a set of metadata from each image of the plurality of images; determining a plurality of images associated with the selected object based on the obtained metadata; calculating a path of movement corresponding to the selected image based on metadata obtained from the plurality of images associated with the selected object, wherein the plurality of images associated with the selected object is placed in sequence; and displaying the plurality of images associated with the selected object in a sequence along the calculated path of movement in a display environment.

Another aspect of the present invention includes a system for arranging images in a sequence for display based on a moving object, the computer system comprising a memory medium comprising program instructions; a bus coupled to the memory medium; and a processor, for executing the program instructions, coupled to an image analysis tool via the bus that, when executing the program instructions, causes the system to: obtain a plurality of images; obtain a selection of an object by a user, the object being selected from an image of the plurality of images; obtain a set of metadata from each image of the plurality of images; determine a plurality of images associated with the selected object based on the obtained metadata; calculate a path of movement corresponding to the selected image based on metadata obtained from the plurality of images associated with the selected object, wherein the plurality of images associated with the selected object is placed in sequence; and display the plurality of images associated with the selected object in a sequence along the calculated path of movement in a display environment.

Yet another aspect of the present invention includes a computer program product for arranging images in a sequence for display based on a moving object, the computer program product comprising a computer readable storage device, and program instructions stored on the computer readable storage device, to: obtain a plurality of images; obtain a selection of an object by a user, the object being selected from an image of the plurality of images; obtain a set of metadata from each image of the plurality of images; determine a plurality of images associated with the selected object based on the obtained metadata; calculate a path of movement corresponding to the selected image based on metadata obtained from the plurality of images associated with the selected object, wherein the plurality of images associated with the selected object is placed in sequence; and display the plurality of images associated with the selected object in a sequence along the calculated path of movement in a display environment.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
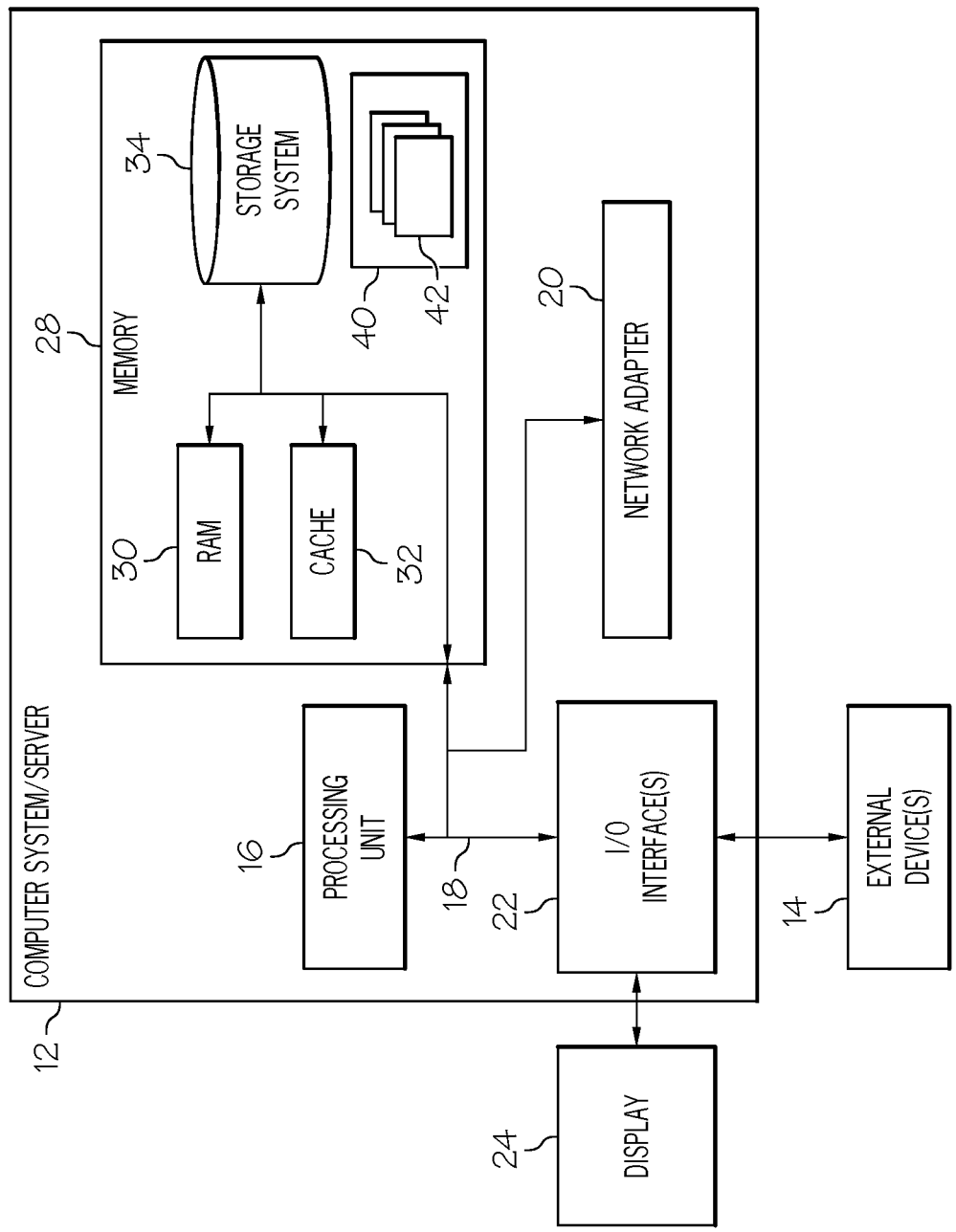
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide approaches for arrangement of images in a sequence for display based on a locus of a moving object in the images. Specifically, a moving object in a plurality of images is selected and metadata of the plurality of images analyzed to determine a locus of the moving object. The plurality of images is arranged along the locus of the moving object in a display environment. Image parameters may be adjusted according to an image placement along the locus, such as angular tilt and size. A place along the locus may be selected and additional images searched for based on a geo-locational metadata tag. The plurality of images may be a series of video frames or a group of photographs Referring now to FIG. 1, a computerized implementation 10 of an embodiment for arrangement of images in a sequence for display based on a locus of a moving object in the images will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other (e.g., special purpose) computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system executable instructions, such as program modules, being executed by a computer system/server. Generally, program modules may include routines, programs, objects, components, logic, data structures, and so on, that perform particular tasks or implement particular abstract data types. In this particular example, computer system/server 12 represents an illustrative system for arrangement of images in a sequence for display based on a locus of a moving object in the images. It should be understood that any other computers implemented under the present invention may have different components/software, but can perform similar functions.

Computer system/server 12 in computerized implementation 10 is shown in the form of a computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for arrangement of images in a sequence for display based on a locus of a moving object in the images, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The inventors of the present invention have discovered that in an image display environment, display touch devices, such as tablets, can be used to view multiple images, and to manipulate the positions of the images with a touch or a finger gesture. Yet, present display devices offer only general methods to organize a plurality of images, such as by size, date, and/or time. However, where a user has collected many images or photographs, images that are only organized by a parameter such as size, date, and/or time may quickly become overwhelming to a user.

The approaches described herein contain numerous advantages over present methods including, but not limited to, orienting a sequence of images or photographs in a display for a user according to a locus of a moving object within the sequence of images or photographs. For example, embodiments of the present invention provide an ability to select an object within an image, photo, and/or video, search for images, photos, and/or videos within a defined scope, and process the images, photos, and/or videos to determine movement of the object for display in sequence on a display with consideration, for example, for relative height. This, among other things, permits a user to automatically view each image of the moving object relative to each other image of the moving object for a sequence that uses the display to show a relative time and displacement of each image from one another. Furthermore, embodiments of the present invention provide the ability to display multiple data sets in an overlaid sequence, as well as extracting a moving object for object presentation as an overlay on a common background for comparative analysis.

These advantages have applications such as in the social media context where providers may desire to offer a service to users and/or customers for plotting movement of objects in shared photographs, images, and videos. These advantages may also be applicable in security or surveillance technology areas.

Figure 2:
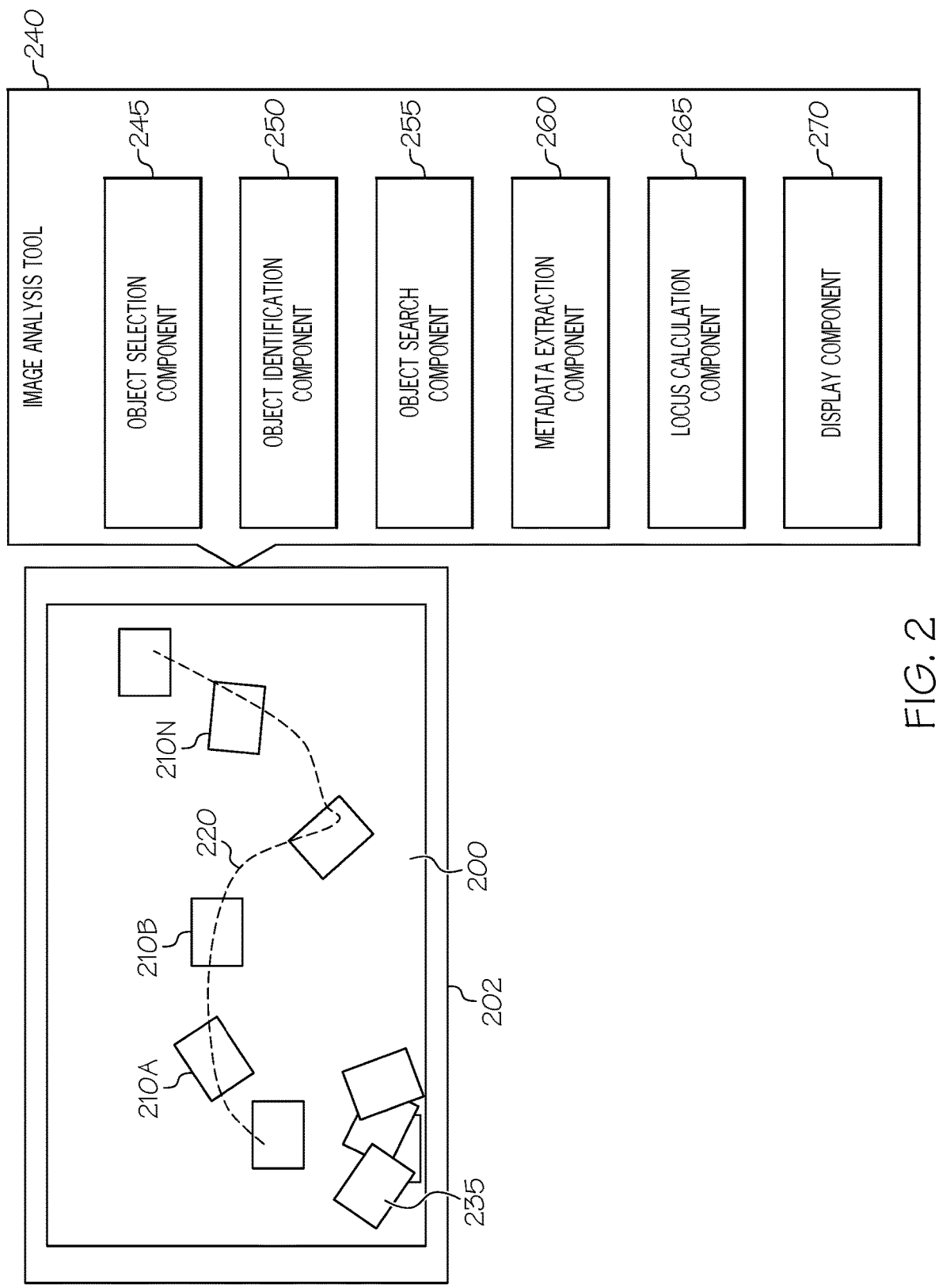
FIG. 2 shows a plurality of images arranged on a display based on a locus of a moving object according to illustrative embodiments.

Referring now to FIG. 2, a plurality of images 210A-N arranged on a display screen 200 of display device 202 based on a locus 220 of a moving object in the plurality of images 210A-N according to illustrative embodiments is shown. As is shown here and below, embodiments of the present invention provide for arrangement of images in a sequence for display based on a locus of a moving object in the images. As is discussed in further detail below, a user may select a moving object (not shown) in an image of plurality of images 210A-N, and based on location and time metadata of plurality of images 210A-N, locus 220 of the moving object is calculated and plurality of images 210A-N are plotted along locus 220. In other words, photographs or images are plotted for display along with a travel path of the moving object. In any case, a moving object is any object which is moving from one point to another point, and is present in different photographs or video. Some images may remain unselected 235, due to, for example, not containing the moving object or having been set aside by the user. This plotting along the locus, among other things, enables a user to visualize comparative positions of a sequence of images or photographs. Once the images 210A-N are plotted along the locus, images 210A-N and locus 220 may be displayed for the user in an image display environment, such as on screen 200 of a display device 202. Display device 202 may include, but is not limited to, a tablet, a laptop, a smartphone, a smart TV, and other such devices. Display device 202 may comprise one or more user interface mechanisms, such as, but not limited to, a touch interface, a mouse, a pointer, or an optical interface. Display device 202 may, in some embodiments, comprise a camera for optical recognition for optical selection.

Display device 202 may also comprise a memory (e.g., memory 28) in which an image analysis tool 240 resides, for example, as a program module 42 of program/utility 40 (FIG. 1) on computer system 12 of FIG. 1 and can enable the functions recited herein. In some embodiments, image analysis tool 240 may be located remotely, such as on a separate server. It is understood that the teachings recited herein may be practiced within any type of computing environment, including, but not limited to, a networked computing environment (e.g., a cloud computing environment). A stand-alone computer system/server 12 is shown in FIG. 1 for illustrative purposes only. In the event the teachings recited herein are practiced in a networked computing environment, each client need not have an image analysis tool 240. Rather, all or part of image analysis tool 240 could be loaded on a server or server-capable device that communicates (e.g., wirelessly) with the clients to provide for arranging images in a sequence for display based on a locus of a moving object in the images. In any case, image analysis tool 240 may comprise one or more components for carrying out embodiments of the present invention.

Image analysis tool 240 may comprise object selection component 245. Object selection component 245 may be configured to enable a user to select an object within at least one image, photograph, or video frame of plurality of images 210A-N. A user may, for example, tap or click the object. In some embodiments, object selection component 245 may recognize the object as an object by a color contrast or other visual contrast. In other embodiments, object selection component 245 may recognize the object by the user circling the object, for example.

Image analysis tool 240 may comprise object identification component 250. Object identification component 250 may receive an image of the selected object from object selection component 245. Object identification component 250 may compare the selected object against a database of objects in order to determine what the selected object is (e.g., animal, vehicle, toy). The identification database may contain a description of how the selected and now identified object is expected to move. This information may be used to fine tune orientation of plurality of images 210A-N with respect to one another.

Image analysis tool 240 may comprise object search component 255. Object search component 255 may search additional images, photographs, or video frames for the selected and/or identified object. This search may be based on, for example, a threshold common pixel pattern, facial recognition, a coloring similarity, an identified same object, or so forth. Object search component 255 may group images having the selected and/or identified object into plurality of images 210A-N, while setting aside unselected images 235.

Image analysis tool 240 may comprise metadata extraction component 260. Metadata extraction component 260 may read plurality of images 210A-N and retrieve metadata from plurality of images 210A-N, such as a location and a timestamp of each image. In the case that some images do not contain a piece of metadata (e.g., a missing location point), metadata extraction component 260 may estimate the missing data point from related metadata in surrounding images. For example, if a location is corrupted in an image, but its timestamp places it equally between a first and a second image, metadata extraction component 260 may estimate the corrupted location to be halfway between the locations of the first and second images.

Image analysis tool 240 may comprise locus calculation component 265. Locus calculation component 265 is configured to determine a travel path, or locus 220 of a moving object based on the extracted metadata such as image location, time, angle, and height.

Image analysis tool 240 may comprise display component 270 for display of the moving object in sequence in a display environment. In some embodiments, display component 270 may display multiple moving object data sets as overlays, or may overlay or underlay additional images extracted from the web.

Figure 3A:
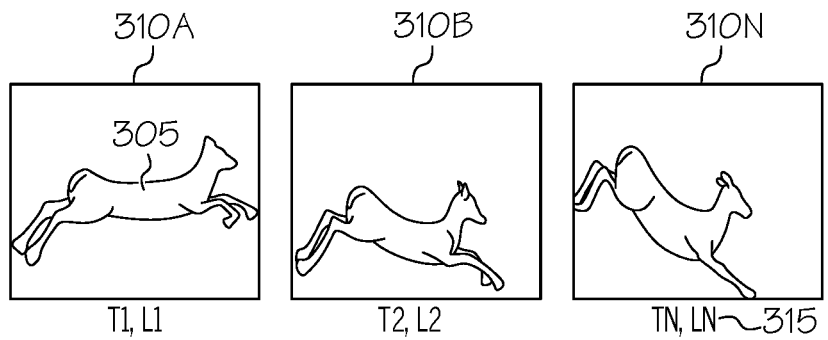
FIGS. 3A, 3B, and 3C show an arrangement of images in sequence based on a locus of a moving object according to illustrative embodiments.
Figure 3B:
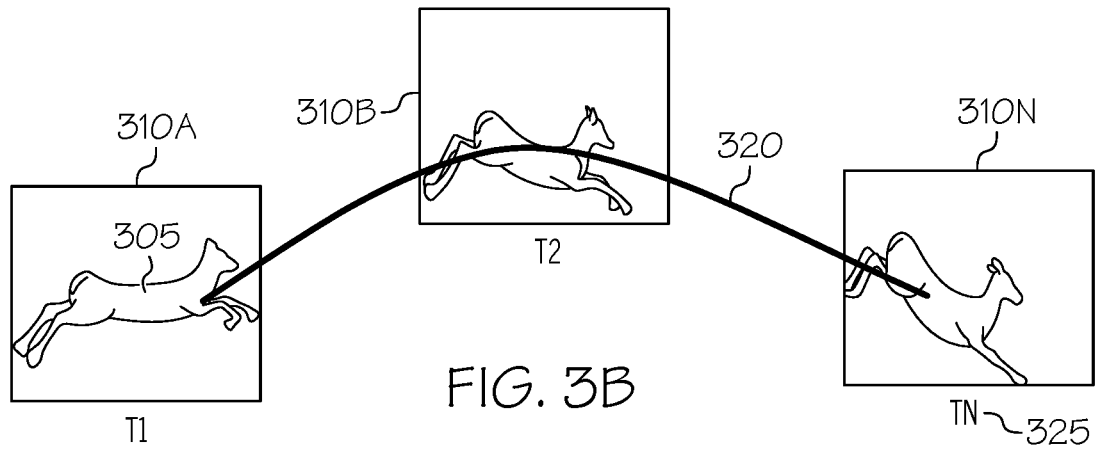
Figure 3C:
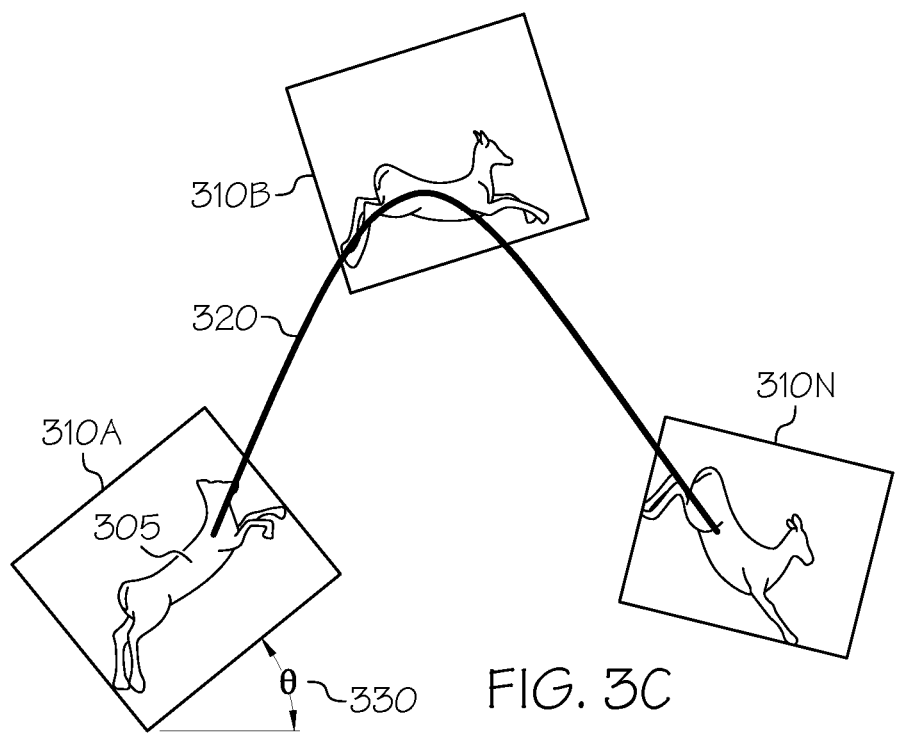

Referring now to FIGS. 3A-3C, and FIG. 3A in particular, an arrangement of images in sequence based on a locus of a moving object according to illustrative embodiments is shown. In one embodiment, a user selects moving object 305 in one of a plurality of images or photographs 310A-N on a display or in a computer folder. In some embodiments, moving object 305 is a context or scope to be searched, where images or photographs comprising moving object 305 are incorporated into plurality 310A-N to be displayed. Image analysis tool 240 (FIG. 2), stored in program module 42 for example, may identify moving object 305 (in this example, a deer) selected by the user and extract set of metadata 315, such as photograph timestamps T1, T2, and TN and locations L1, L2, and LN.

Referring now to FIG. 3B, from the above set of metadata 315 (e.g., T1-TN and L1-LN), image analysis tool 240 (FIG. 2) may calculate locus 320 of moving object 305. Locus 320 is the set of points or a path that defines the movement of moving object 305 through a space. Plurality of images or photographs 310A-N are arranged along locus 320 corresponding to relative times T1-TN and locations L1-LN of each image or photograph 310A-N to one another. In some embodiments, this arrangement may be generated automatically. In any case, images or photographs 310A-N are placed in a display environment, such as a computer display or folder, a tablet, a smart TV, etc.

Referring now to FIGS. 3C and 3B, plurality of images or photographs 310A-N may be arranged a time difference from one another as shown in FIGS. 3B and 3C depending on relative times T1-TN between the images. For example, in FIG. 3B, plurality of images or photographs 310A-N have relatively long times T1-TN between each image, while in FIG. 3C, plurality of images or photographs 310A-N have relatively short times T1-TN between each image. In some embodiments, relative times 225 (e.g., T1-TN) may be displayed near (e.g., below) such that a user viewing plurality of images or photographs 310A-N may be provided with a time difference between each image or photograph.

Furthermore, plurality of images or photographs 310A-N may be arranged at a displacement from one another as shown in FIGS. 3B and 3C depending on relative location L1-LN between the images. A displacement may be along any abscissa (x), ordinate (y), and applicate (z) axis. For example, in FIG. 3B, plurality of images or photographs 310A-N shows a long jump of moving object 305, having a small displacement in the z-plane, and a large displacement in the y-plane, based on locations L1-LN. In FIG. 3C, plurality of images or photographs 310A-N shows a high jump of moving object 305, having a large displacement in the z-plane, and a small displacement in the y-plane, based on locations L1-LN.

Furthermore, as shown in FIG. 3C, plurality of images or photographs 310A-N may be angled to show angular direction 330 of moving object 305. In some embodiments, moving object 305 may be identified (e.g., as a deer in the present example) and plurality of images or photographs 310A-N adjusted automatically along locus 320 to orient moving object 305 according to a predetermined specification (e.g., how a deer should be oriented when making a long or high jump). In other embodiments, metadata 315 is extracted from plurality of images or photographs 310A-N to determine an orientation (e.g., relative to the horizontal) of, for example, an imaging or photographic device, at the time plurality of images or photographs 310A-N were created. From this orientation metadata, an angular direction 330 ("θ") of each of plurality of images or photographs 310A-N to one another is determined.

In some embodiments, plurality of images or photographs 310A-N may be several sets of pluralities of images or photographs. A user may also select one or more moving objects 305 from one or more images or photographs of one or more pluralities of images or photographs 310A-N. For example, a user may have a first plurality of photographs showing a deer running across a field, as well as a second plurality of photographs showing a rabbit (not shown) hopping up a hill in the field. A user may select multiple moving objects 305 (e.g., the deer and the rabbit). The loci 320 of these selected multiple moving objects 305 will then be determined and plotted such that the movement of first and second moving objects 305 may be visualized along with first and second plurality of photographs 310A-N. In some embodiments, a user may also choose to exclude some images or photographs from plurality of images or photographs 310A-N, and accordingly not plot the excluded images or photographs along locus 320.

In further embodiments, plurality of images or photographs 310A-N may be a series of frames from a video. For example, frames may be extracted from a video (e.g., shot at 24 fps) and plotted along locus 320 of user selected moving object 305 in the frames, using the same approaches as described above. In some embodiments, locus 320 may be shown as an overlay in the video. In still other embodiments, locus 320 and plurality of images or photographs 310A-N comprising the video frames may be displayed while the video is played in a same or separate display environment.

In several illustrative examples below, applications of a plurality of images or photographs 310A-N or a plurality of video frames displayed along locus 320 of user selected moving object 305 in the images, photographs, or frames are shown.

In a first example, a user has captured a video of an aircraft take off. Multiple video thumbnails are arranged in a sequence along a locus of the airplane such that the user can view the take-off angle of aircraft. In some embodiments, not all frames or images are displayed. For example, in a video shot at 24 fps, for example only every $6^{th}$ frame may be displayed. The user may, for example, compare the airplane take-off sequence to another sequence of airplane take-off images.

In another example, a user has captured video of a mountain hike. A user may track images of a mountain path followed, for example, in order to determine, among other things, an inclination of the mountain and a climbed height, in order to compare the hiking video from a previous year to determine comparative information for mountain hiking data (e.g., greater incline, improved pace).

In another example, a user retrieves a video of a football or soccer game from online. The user selects the ball as the moving object, and the locus of the ball is then plotted based on a sequence of image frames. The user may then view these image frames along the locus of the ball in a display of progress in the game.

In still another example, photos are taken of a fish swimming under water with two cameras: one positioned above the water and one positioned below the water. The sets of photographs collected by both cameras may be cross-referenced in order to create a locus for the fish, and the photographs displayed along the locus.

In still further embodiments, a user may select a portion of locus 320 and retrieve a location coordinate associated with that selected portion of locus 320. For example, a location coordinate may be calculated or estimated from two adjacent image or photograph location coordinates. The selected portion of locus 320 or the location coordinate may be searched (e.g., via a web search) to find additional images or photographs associated with that location coordinate. The additional images or photographs may be displayed in locational sequence along locus 320 with plurality of images or photographs 310A-N. In still other embodiments, locus 320 and plurality of images or photographs 310A-N may be displayed as an overlay of any image or map retrieved in a search.

For example, a user wishes to display a plurality of photographs showing her son running down the steps of the Lincoln Memorial in Washington, D.C. The user selects her son in the photographs and his locus is calculated from time and location metadata in the photographs. The user may then search for an image of the Lincoln Memorial, based on the location of the photographs, to overlay the plurality of images of her son on the stairs and the locus of him running. In a related example, the user wishes to display a plurality of photographs of her son playing on the National Mall. After a locus of the son's movements has been calculated, the user may select points along the locus. These selected points may be searched by location coordinates to find additional images or photographs from that location on the locus.

Figure 4:
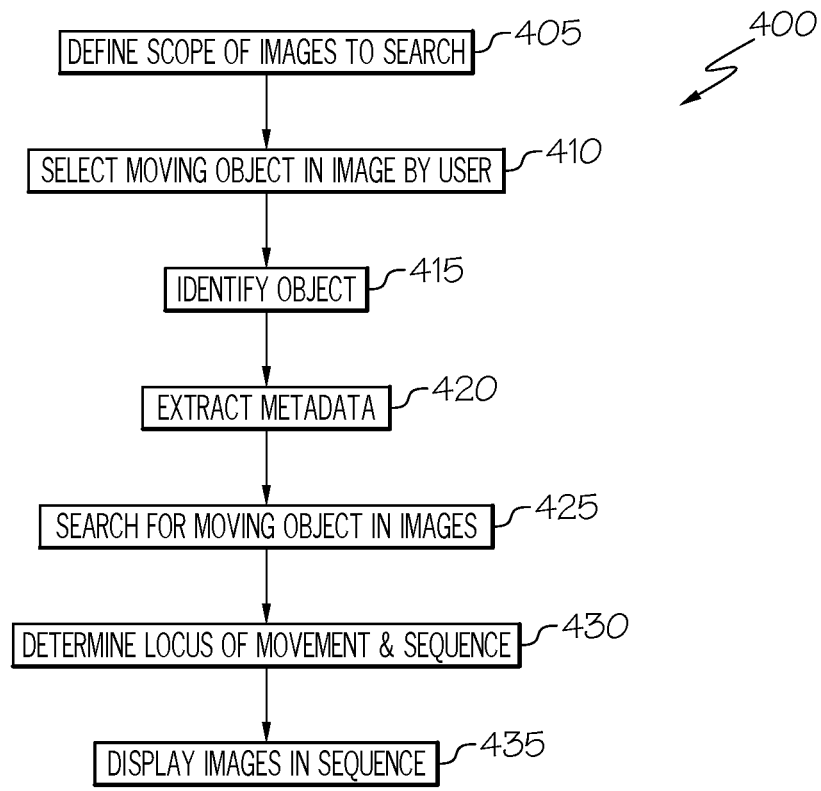
FIG. 4 shows an implementation of an image arrangement process according to illustrative embodiments.

Referring now to FIG. 4, in conjunction with FIGS. 2 and 3A, an implementation of an image arrangement process 400 according to illustrative embodiments is shown. At step 405, a scope of images, such as photos or video, to be searched is defined. For example, a user may select one or more folders, one or more videos, or a group of images.

From this selected scope, a set of images will be arranged according to embodiments of the present invention.

At step 410, the user selects moving object 305 from one of the scope of images. For example, a user may select an object by touching the object in a touch interface, clicking the object with a mouse pointer, or selecting the object with an optical pointer or optical recognition of touch. Metadata 315 is also extracted from user selected moving object 305. For example, metadata 315, such as date and time of capture, location of capture, direction of capture, tilt angle of capture, zoom level of capture, etc., may be extracted.

At step 415, moving object 305 is identified. Moving object 305 may be extracted from its associated image using techniques currently know in the art, such as analysis of color and contrast, and user directed circling of the object. Moving object 305 is then analyzed to identify moving object 305 also using techniques understood in the art, such as object recognition technology (e.g., facial recognition), and comparison to objects stored in a database, data store, or library. Natural language processing may be applied to determine an object name. For example, a user may be requested to say the name of the selected object into a microphone of display device 202. This spoken name/word may be analyzed using techniques understood in the art to determine the textual word for the object, and the object may be identified. In some embodiments, a user may also say the object the user wishes to select, and the object will be selected in the image based on the user's vocal naming of the object.

At step 420, metadata 315 is extracted from the images in the defined scope. Metadata 315 may include, but is not limited to, date and time of capture, location of capture, direction of capture, tilt angle of capture, zoom level of capture. At step 425, additional instances of moving object 305 are searched for across the defined scope of images. This search may include, for example, one or more parameters describing moving object 305 (e.g., coloring, size, identity), associated metadata (e.g., date and time of capture, location of capture, direction of capture, tilt angle of capture, zoom level of capture), and user-defined search scope. For example, a search is performed for groups of images with the same date and sequential times for the desired moving object.

At step 430, locus 220 of moving object 305 and sequence of plurality of images 210A-N are determined. In an embodiment, images having moving object 305 are grouped from the search of step 425. For example, images where selected moving object 305 is present are clustered and sorted based on date and time of capture. Object recognition methods may also be used to identify the position of moving object 305 in different subsequent images. Using metadata 315 collected at step 420, relative positions of object 305 in subsequent images are determined. For example, image metadata such as direction, tilt angle, and zoom level may be factors in the calculation. In another example, using metadata 315, relative speed/velocity and direction/displacement of moving object 305 in each image as compared to one another are calculated. For example, time and location metadata may be used to calculate speed/velocity where speed/velocity is distance divided by time. In yet another example, using metadata 315, movement and direction of moving object 305 is calculated, for example, by comparing the location metadata of subsequent images. These calculations may be applied, among other things, to determine the sequence and positions of plurality of images 210A-N along calculated locus 220.

At step 435, plurality of images 210A-N is displayed in sequence. In some embodiments, multiple pluralities of images 210A-N may be displayed, each showing a moving object 305 having a locus 220. For example, locus 220 (e.g., movement path) is identified and plurality of images 210A-N displayed along locus 220. Displayed plurality of images 210A-N may be shown with characteristics of the movement of moving object 305, such as height and angling. In further examples where more than one moving object 305 is available (e.g., an object shown on multiple days), a user may be presented with the option of selecting a single moving object data set for display, or viewing a data overlay of multiple loci.

Figure 5:
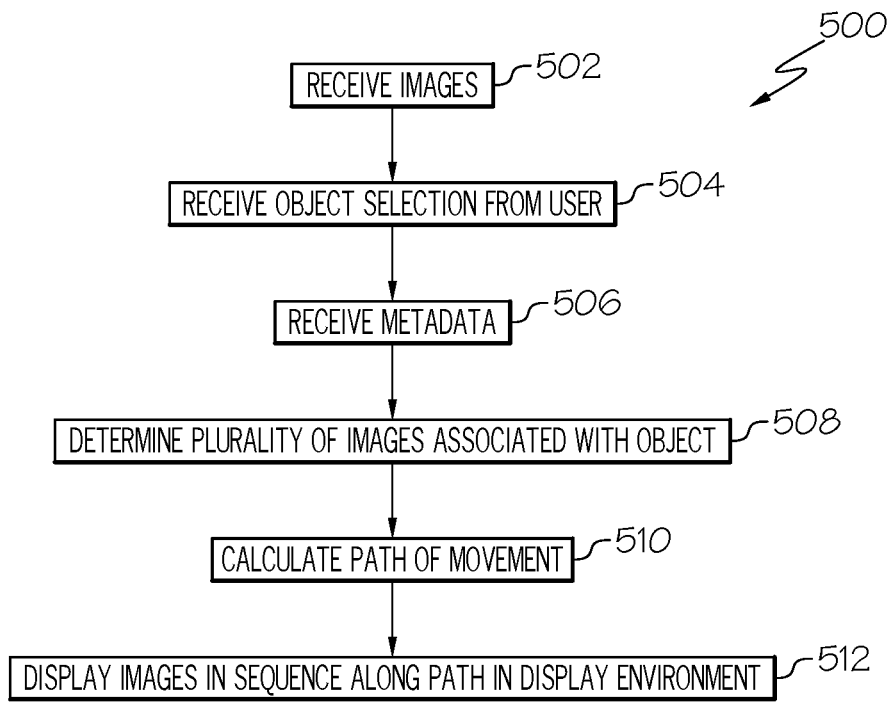
FIG. 5 shows a process flowchart for arrangement of images in a sequence for display based on the locus of moving objects in the images according to illustrative embodiments.

As depicted in FIG. 5, a system (e.g., computer system 12) carries out the methodologies disclosed herein. Shown is a process flowchart 500 for arrangement of images in a sequence for display based on a locus of a moving object in the images. At step 502, a plurality of images is received. At step 504, a selection of an object from a user is received, the object being selected from an image of the plurality of images. At step 506, a set of metadata from each image of the plurality of images is received. At step 508, a plurality of images associated with the selected object is determined based on the received metadata. At step 510, a path of movement corresponding to the selected image is calculated based on metadata received from the plurality of images associated with the selected object, wherein the plurality of images associated with the selected object is placed in sequence. At step 512, the plurality of images associated with the selected object is displayed in a sequence along the calculated path of movement in a display environment.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for arrangement of images in a sequence for display based on a locus of a moving object in the images. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for arrangement of images in a sequence for display based on a locus of a moving object in the images. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to arrange images in a sequence for display based on a locus of a moving object in the images. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for arranging images in a sequence for display based on a moving object, comprising:

obtaining a plurality of images;

obtaining a selection of an object by a user, the object being selected from an image of the plurality of images;

comparing the selected object against a database of objects and obtaining, based on an identification of the object in the database, a description of a manner in which the selected object is expected to move;

obtaining a set of metadata from each image of the plurality of images;

determining a plurality of images associated with the selected object based on the obtained metadata;

calculating a path of movement corresponding to the selected image based on the manner in which the selected object is expected to move and metadata obtained from the plurality of images associated with the selected object, wherein the plurality of images associated with the selected object is placed in sequence; and displaying the plurality of images associated with the selected object in a sequence along the calculated path of movement in a display environment.

2. The method of claim 1, wherein the plurality of images comprises at least one of a set of photographs or a set of video frames.

3. The method of claim 1, wherein the metadata comprises a time of capture and a location of capture and at least one of: a direction of capture, an angle of capture, and a zoom level of capture.

4. The method of claim 1, the method further comprising:

identifying the selected object using at least one of: a recognition algorithm or a data store; and applying the identity of the selected object to the plurality of images to determine the plurality of images associated with the selected object.

5. The method of claim 1, wherein the displaying further comprises applying a displacement between at least two images of the plurality of images associated with the selected object, the displacement comprising at least two of: an abscissa displacement, an ordinate displacement, and an applicate displacement, and wherein the displaying further comprises applying an angular tilt to at least one image of the plurality of images associated with the selected object.

6. The method of claim 1, the method further comprising:

obtaining a selection of a location along the path of movement by the user; and providing the user with an image corresponding to the selected location based on a web search.

7. The method of claim 1, wherein the user selects at least two objects and wherein the method further comprises displaying a plurality of images associated with each of the selected objects in a sequence along a calculated path of movement in the display environment.

8. A computer system for arranging images in a sequence for display based on a moving object, the computer system comprising:
- a memory medium comprising program instructions;
- a bus coupled to the memory medium; and
- a processor, for executing the program instructions, coupled to an image analysis tool via the bus that, when executing the program instructions, causes the system to:
  - obtain a plurality of images;
  - obtain a selection of an object by a user, the object being selected from an image of the plurality of images;
  - compare the selected object against a database of objects and obtain, based on an identification of the object in the database, a description of a manner in which the selected object is expected to move;
  - obtain a set of metadata from each image of the plurality of images;
  - determine a plurality of images associated with the selected object based on the obtained metadata;
  - calculate a path of movement corresponding to the selected image based on the manner in which the selected object is expected to move and metadata obtained from the plurality of images associated with the selected object, wherein the plurality of images associated with the selected object is placed in sequence; and
  - display the plurality of images associated with the selected object in a sequence along the calculated path of movement in a display environment.

9. The computer system of claim 8, wherein the plurality of images comprises at least one of a set of photographs or a set of video frames.

10. The computer system of claim 8, wherein the metadata comprises a time of capture and a location of capture and at least one of: a direction of capture, an angle of capture, and a zoom level of capture.

11. The computer system of claim 8, the instructions further causing the system to:
- identify the selected object using at least one of: a recognition algorithm or a data store; and
- apply the identity of the selected object to the plurality of images to determine the plurality of images associated with the selected object.

12. The computer system of claim 8, the instructions further causing the system to apply in the display environment a displacement between at least two images of the plurality of images associated with the selected object, the displacement comprising at least two of: an abscissa displacement, an ordinate displacement, and an applicate displacement, and the instructions further causing the system to apply an angular tilt to at least one image of the plurality of images associated with the selected object.

13. The computer system of claim 8, the instructions further causing the system to: obtain a selection of a location along the path of movement by the user; and
- provide the user with an image corresponding to the selected location based on a web search.

14. The computer system of claim 8, wherein the user selects at least two objects and wherein the instructions further cause the system to display a plurality of images associated with each of the selected objects in a sequence along a calculated path of movement in the display environment.

15. A computer program product for arranging images in a sequence for display based on a moving object, the computer program product comprising at least one computer readable hardware storage device, and program instructions collectively stored on the at least one computer readable hardware storage device, to:
- obtain a plurality of images;
- obtain a selection of an object by a user, the object being selected from an image of the plurality of images;
- compare the selected object against a database of objects and obtain, based on an identification of the object in the database, a description of a manner in which the selected object is expected to move;
- obtain a set of metadata from each image of the plurality of images;
- determine a plurality of images associated with the selected object based on the obtained metadata;
- calculate a path of movement corresponding to the selected image based on the manner in which the selected object is expected to move and metadata obtained from the plurality of images associated with the selected object, wherein the plurality of images associated with the selected object is placed in sequence; and
- display the plurality of images associated with the selected object in a sequence along the calculated path of movement in a display environment.

16. The computer program product of claim 15, wherein the metadata comprises a time of capture and a location of capture and at least one of: a direction of capture, an angle of capture, and a zoom level of capture.

17. The computer program product of claim 15, the at least one computer readable storage device further collectively comprising instructions to:
- identify the selected object using at least one of: a recognition algorithm or a data store; and
- apply the identity of the selected object to the plurality of images to determine the plurality of images associated with the selected object.

18. The computer program product of claim 15, the at least one computer readable storage device further collectively comprising instructions to apply in the display environment a displacement between at least two images of the plurality of images associated with the selected object, the displacement comprising at least two of: an abscissa displacement, an ordinate displacement, and an applicate displacement, and the computer readable storage device further comprising instructions to apply an angular tilt to at least one image of the plurality of images associated with the selected object.

19. The computer program product of claim 15, the at least one computer readable storage device further collectively comprising instructions to:
- obtain a selection of a location along the path of movement by the user; and
- provide the user with an image corresponding to the selected location based on a web search.

20. The computer program product of claim 15, wherein the user selects at least two objects and the computer readable storage device further comprising instructions to display a plurality of images associated with each of the selected objects in a sequence along a calculated path of movement in the display environment.

* * * * *